United States Patent Office 3,037,905
Patented June 5, 1962

3,037,905
FUNGICIDAL COMPOUNDS, COMPOSITIONS THEREOF, AND METHODS OF UTILIZING SAME
Perttu V. Laakso, Barrington, Ill., assignor to The Kendall Company, Boston, Mass., a corporation of Massachusetts
No Drawing. Filed Mar. 26, 1956, Ser. No. 573,593
21 Claims. (Cl. 167—30)

This invention relates to novel aromatic mercaptoaliphatic compounds and to analogous selenium and tellurium compounds and their preparation. The invention also relates to the use of these compounds in fungicidal compositions.

It is a primary object of the invention to prepare as novel compounds certain derivatives of phenylmercaptoaliphatic compounds. It is a further object of the invention to provide methods of preparing these novel compounds and also compositions containing them which are exceedingly effective in their fungicidal action.

Other objects and advantages will become apparent from the following description and appended claims.

The compounds of the present invention comprise in general substances having the formula:

$$Ar-B-\underset{\underset{Z}{|}}{CH}-(CH_2)_n-R$$

in which Ar is a phenyl aromatic group; B represents sulphur, selenium, or tellurium; Z represents hydroxyl, mercapto, halogen, or thiocyanate; R represents hydroxyl, mercapto, halogen, carboxyl, or carbalkoxy, in which the alkyl group contains from 1 to 3 carbon atoms; and $n$ is a numeral, varying from 1 to 5 when R represents hydroxyl, mercapto, or halogen and from 0 to 5 when R represents carboxyl or carbalkoxy.

The following examples will serve to illustrate the novel products of the present invention and their preparation.

EXAMPLE 1

Alpha-mercaptophenylmercaptoacetic acid methyl ester having the formula:

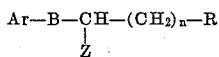

was prepared by adding 0.1 mol of methyl alpha-chlorophenylmercaptoacetate at 0° C. to a stirred freshly-prepared solution of potassium hydrosulphide in 90% ethanol. The mixture was then stirred at room temperature for 60 minutes, after which water was added and the oily layer was extracted with ether. The ether layer was then washed with water and dried with sodium sulphate, after which the ether was evaporated and the residue was distilled in vacuo. The reaction product was a yellow mobile liquid having a characteristic odor and a boiling point of 160 to 165° C. at 1.0 mm. Hg.

EXAMPLE 2

Alpha-bromophenylmercaptoacetic acid having the formula:

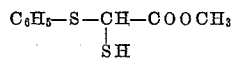

was prepared by treating 1 mol of phenylmercaptoacetic acid with 1.05 mols of N-bromosuccinimide dissolved in ether at room temperature until vigorous reaction ceased. The reaction mixture was then filtered; the ether evaporated from the filtrate; and the residue recrystallized from carbon tetrachloride as colorless needles having a melting point of 103 to 105° C.

EXAMPLE 3

Alpha-hydroxyphenylmercaptoacetic acid having the formula:

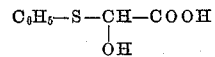

was prepared by dissolving 1.0 mol of alpha-chlorophenyl mercaptoacetic acid in a water solution containing an excess of sodium bicarbonate, after which the solution was extracted with ether. The water layer was then acidified, which resulted in a precipitate of the alpha-hydroxyphenylmercaptoacetic acid. The product had a melting point of 103 to 105° C. after recrystallizing from carbon tetrachloride.

EXAMPLE 4

Alpha-hydroxyphenylmercaptoacetic acid methyl ester having the formula:

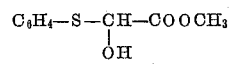

was prepared by refluxing 0.1 mol of methyl alpha-bromophenylmercaptoacetate in 100 ml. of water for 2 hours with an excess of calcium carbonate. The oily layer was extracted with ether, washed with a dilute sodium carbonate solution and water, and finally dried with sodium sulphate. After evaporation of the ether a thick oil was obtained as the residue, which decomposed upon distilling it.

EXAMPLE 5

Alpha-mercaptophenylmercaptoacetic acid having the formula:

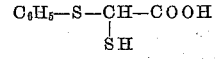

was prepared by treating 1 mol of alpha-bromophenylmercaptoacetic acid with 2.4 mols of potassium hydrosulphide dissolved in 90% ethanol at 10° C. for 2 hours. After acidifying the mixture, water was added, and the resulting oily layer was extracted with ether, after which it was washed with water and dried with sodium sulphate. After evaporating the ether, the yellow oil which remained solidified and was purified by recrystallizing from ethanol. It had a melting point of 55 to 58° C.

EXAMPLE 6

The thiocyanate derivative having the formula:

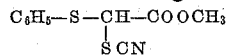

was prepared in the manner described in Example 1, except that potassium thiocyanate was substituted for the potassium hydrosulphide.

The compounds of the invention, prepared for example as described above, are useful as the active ingredient in fungicidal compositions containing the compound along with a suitable diluent or carrier. For example, these compounds have been found to be excellent inhibitors of such pathological fungi as:

Candida albicans
Trichophyton mentagrophytes
Trichophyton gypseum
Trichophyton rubrum
Trichophyton purpureum
Trichophyton crateriforme
Trichophyton schoenleinii
Trichophyton tonsurans
Epidermophyton floccosum
Blastomyces dermatitidis
Microsporum canis
Microsporum gypseum
Microsporum fulvum
Microsporum audouini To be useful as an inhibitor of fungus growth, an agent must be effective in such concentrations that the agent itself is not destructive of the material or living tissue to which it may be applied. The compounds of this invention are in general sufficiently mild to be substantially innocuous to the various materials to which they are applied, when used in the amounts necessary for inhibition of fungus growth. In general, compositions containing between 2 and 10% of the aralkyl compound are preferred. Where skin areas have become tender due to fungus infections, it is desirable to use concentrations in such treatment not higher than 15%. Concentrations higher than 15%, while effective in fungus growth inhibition, have a tendency to be too harsh for application to such tender raw areas.

The effectiveness of these compounds as inhibitors of the fungi hereinbefore mentioned has been demonstrated by extensive in vitro tests. For example, tests were made upon the fungus Candida albicans which is a disease producing organism causing both superficial and systemic infections characterized by a high order of resistance to chemotherapy. The lock of sensitivity of Candida albicans to the inhibiting and fungicidal action of most antifungal agents has long been recognized. It can be taken as a general rule therefore with but few exceptions that any chemical agent active against Candida albicans will show a similar or greater activity against other pathogenic fungi.

Because Candida albicans grows well and quickly on artificial media, it lends itself particularly to the following effectiveness test. It is to be understood, however, that the test procedure is substantially the same when applied to other fungi.

*Test Method*

Small volumes (.1–.25 cc.) of acetone solutions of varying concentrations of the fungicidal compound are added to a series of tubes containing sterile, melted Sabouraud's agar. The tubes are first shaken to disperse the compound and are then cooled in an inclined position to solidify the agar. In general, concentrations of 25, 12.5, 6.2, 3.1, 1.5, .7, .3, and .15 milligrams of the fungicidal compound per 20 cc. of media are obtained. The surface of the treated agar in each tube is then streaked with a one millimeter loop of a suspension prepared by suspending a 24–48 hour Sabouraud's agar culture of Candida albicans (or other fungus) in 2 cc. of sterile distilled water. The inoculated tubes are stored at room temperature for 48 hours and then checked for evidence of growth. The lowest concentration of acid which completely prevents growth measures the activity of the compound under test.

In the case of other fungi the test procedure is the same as described above, except that the aging period should be continued for at least 10 days.

In the following table the activity or effectiveness of representative compounds of the invention against the fungus Candida albicans is given. The activity in each instance is represented in milligrams per 20 cc. of agar required to prevent growth, using the test method outlined above.

TABLE I

| Compound | Milligrams per 20 mls. of agar |
| --- | --- |
| Alpha-mercaptophenylmercaptoacetic acid methyl ester | 1.0 |
| Alpha-bromophenylmercaptoacetic acid | 12.0 |
| Alpha-hydroxyphenylmercaptoacetic acid | 25.0 |
| Alpha-hydroxyphenylmercaptoacetic acid methyl ester | 25.0 |
| Alpha-mercaptophenylmercaptoacetic acid | 25.0 |

In the following table the activity or effectiveness of the compound alpha-mercaptophenylmercaptoacetic acid methyl ester against various pathogenic fungi is given. The activity in each instance, as in Table I, is represented in milligrams per 20 cc. of agar required to prevent growth, using the same test method.

TABLE II

| Fungus | Milligrams of ester per 20 mls. of agar |
| --- | --- |
| Trichophyton gypsceum | 1.0 |
| Microsporum canis | 1.0 |
| Microsporum gypseum | 1.0 |
| Microsporum audouini | 0.5 |
| Candida albicans | 5.0 |

Twenty-five milligrams in 20 milliliters of agar represent a concentration in the range of .12% by weight. Although concentrations less than those indicated in Table I also tend to exert an inhibitory influence, the inhibition may be incomplete in the particular environment.

The preferred method by which I inhibit fungus growth is by utilizing a dusting powder in which the fungicidal agent is mixed with finely powdered diluent dusts such as talc, corn starch, rice, starch, kaolin, precipitated chalk, zinc oxide, zinc stearate, magnesium oxide and the like. Any generally non-toxic inert powder may be utilized as a diluent.

The fungicidal agent may also be applied by means of ointments, or by means of liquids either in diluted or dispersed form, including for example sprays, vapors, solutions, emulsions and the like. In such cases the agent may be either in a volatile or non-volatile liquid carrier.

The following examples of fungus inhibitory dusts are given by way of illustration.

EXAMPLE 7

|   | Percent |
| --- | --- |
| Alpha - mercaptophenylmercaptoacetic acid methyl ester | .3 to 10 |
| Talc | 99.7 to 90 |

EXAMPLE 8

| Alpha-bromophenylmercaptoacetic acid | 10 |
| --- | --- |
| Talc | 80 |
| Corn starch | 10 |

EXAMPLE 9

| Alpha-hydroxyphenylmercaptoacetic acid | 10 |
| --- | --- |
| Talc | 60 |
| Starch | 20 |
| Kaolin | 10 |

EXAMPLE 10

| Alpha - hydroxyphenylmercaptoacetic acid methyl ester | 10 |
| --- | --- |
| Talc | 50 |
| Starch | 20 |
| Zinc oxide | 20 |

EXAMPLE 11

| Alpha-mercaptophenylmercaptoacetic acid | 2 |
| --- | --- |
| Boric acid | 6 |
| Zinc stearate | 3 |
| Exsiccated alum | 1 |
| Starch | 10 |
| Talc | 78 |

The following are representative examples of suitable ointments capable of inhibiting fungus growth:

EXAMPLE 12

| Phenyltelluriumacetic acid | .2 to 15 |
| --- | --- |
| Polyethylene glycol (mol. wt. about 1600) | 99.8 to 85 |

EXAMPLE 13

| Phenylselenylacetic acid | .2 to 15 |
| --- | --- |
| Petrolatum | 99.8 to 85 |

The following are representative examples of useful fungus-inhibitory solutions:

EXAMPLE 14

Alpha-bromophenylmercaptoacetic acid _____ .5
Acetone _____ 99.5

EXAMPLE 15

Alpha-mercaptophenylmercaptoacetic acid _____ 2
95% ethyl alcohol_____ 98

The following is an example of a non-drying fungus-inhibitory solution:

EXAMPLE 16

Alpha-thiocyanophenylmercaptoacetic acid methyl ester_____ 10
Glycerine _____ 90

In some instances it is desirable to employ conventional propellent liquids as the carrier. By propellent liquids I refer to gaseous carriers which have been liquefied under pressure and have admixed therewith a solid or liquid agent. Such carriers, when released from confinement through a small orifice in the form of a fine spray, carry the liquid or solid agent with them, thereby serving as a propellant. The preferred materials for this purpose are the fluorinated hydrocarbon propellants, particularly derivatives of methane and ethane.

The following are examples of suitable propellent mixtures or solutions:

EXAMPLE 17

Alpha-mercaptophenylmercaptoacetic acid methyl ester _____ 5
Isopropanol _____ 5
Trichloro monofluoromethane_____ 45
Dichloro difluoromethane _____ 45

EXAMPLE 18

Alpha-bromophenylmercaptoacetic acid_____ 2
Isopropanol _____ 5
Dichlorotetrafluoroethane _____ 93

EXAMPLE 19

Alpha-hydroxyphenylmercaptoacetic acid _____ 10
Ethyl alcohol_____ 5
Dimethyl ether _____ 85

EXAMPLE 20

Alpha-hydroxyphenylmercaptoacetic acid methyl ester _____ 8
Carbon dioxide_____ 92

EXAMPLE 21

Alpha-mercaptophenylmercaptoacetic acid _____ 5
Ethyl chloride_____ 95

The solutions of Examples 17 to 21 are all propellent mixtures which are applied under pressure from a conventional bomb type can.

Although it is usually preferable to employ between about 2 and 10% of the fungicidal agent in compositions intended for use on human skin, in some instances concentrations as high as 20% of the agent based on the total weight of the non-volatile constituents of the composition may be employed without harm. Moreover, when applying the fungicidal agents of the invention to surfaces other than the skin, they may frequently be applied in higher concentrations to advantage.

I claim:

1. A compound having the formula:

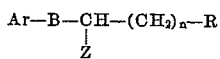

in which Ar is a phenyl group; B is a member selected from the group consisting of sulfur, selenium and tellurium; Z is a member selected from the group consisting of hydroxyl, mercapto, halogen and thiocyanate; R is a member selected from the group consisting of hydroxyl, mercapto, halogen, carboxyl and carbalkoxy in which the alkyl group contains from 1 to 3 carbon atoms; and $n$ is a numeral varying from 1 to 5 when R is any one of said hydroxyl, mercapto and halogen members, and varying from 0 to 5 when R is any one of said carboxyl and carbalkoxy members.

2. A compound having the formula:

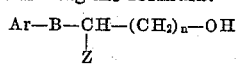

in which Ar is a phenyl group; B is a member selected from the group consisting of sulfur, selenium and tellurium; Z is a member selected from a group consisting of hydroxyl, mercapto, halogen and thiocyanate; and $n$ is a numeral varying from 1 to 5.

3. A compound having the formula:

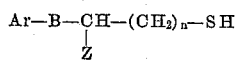

in which Ar is a phenyl group; B is a member selected from the group consisting of sulfur, selenium and tellurium; Z is a member selected from a group consisting of hydroxyl, mercapto, halogen and thiocyanate; and $n$ is a numeral varying from 1 to 5.

4. A compound having the formula:

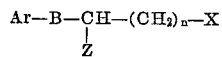

in which X is a halogen: Ar is a phenyl group; B is a member selected from the group consisting of sulfur, selenium and tellurium; Z is a member selected from a group consisting of hydroxyl, mercapto, halogen and thiocyanate; and $n$ is a numeral varying from 1 to 5.

5. Alpha-mercaptophenylmercaptoacetic acid methyl ester.

6. Alpha-bromophenylmercaptoacetic acid.

7. Alpha-hydroxyphenylmercaptoacetic acid.

8. Alpha-hydroxyphenylmercapptoacetic acid methyl ester.

9. Alpha-mercaptophenylmercaptoacetic acid.

10. A process which comprises reacting a phenylmercapto compound of the following formula:

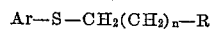

with an N-halogen succinimide by mixing said phenylmercapto compound and said succinimide compound together while controlling the temperature of the reaction such that the halogen of the succinimide compound is substituted on the aliphatic carbon atom alpha to the sulfur substituent to yield a halogenated compound having the following formula:

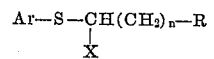

wherein in said formulas Ar is a phenyl group; R is a member selected from the group consisting of hydroxyl, mercapto, halogen, carboxyl, and carbalkoxy in which the alkyl group contains from 1 to 3 atoms; $n$ is a numeral varying from 1 to 5 when R is any one of said hydroxyl, mercapto and halogen members, and varying from 0 to 5 when R is any one of said carboxyl and carbalkoxy members; and X is the halogen supplied by the N-halogen succinimide.

11. The process of claim 10 wherein the N-halogen compound is N-bromosuccinimide.

12. The process of claim 10 wherein the N-halogen compounds is N-chlorosuccinimide.

13. A process which comprises reacting a compound of the following formula:

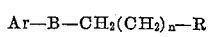

with an N-halogen succinimide by mixing said compound with said succinimide while controlling the temperature of the reaction such that the halogen of the succinimide compound is substituted on the aliphatic carbon atom alpha to the B substituent to yield a halogenated compound of the following formula:

$$Ar-B-\underset{X}{CH}(CH_2)_n-R$$

wherein in said formulas Ar is a phenyl group; B is a member selected from the group consisting of sulfur, selenium and tellurium; R is a member selected from the group consisting of hydroxyl, mercapto, halogen, carboxyl, and carbalkoxy in which the alkyl group contains from 1 to 3 atoms; $n$ is a numeral varying from 1 to 5 when R is any one of said hydroxyl, mercapto and halogen members, and varying from 0 to 5 when R is any one of said carboxyl and carbalkoxy members; and X is the halogen supplied by the N-halogen succinimide.

14. An anti-fungal composition containing as an essential active ingredient a compound having the general formula:

$$Ar-B-\underset{Z}{CH}-(CH_2)_n-R$$

in which Ar is a phenyl group; B is a member selected from the group consisting of sulfur, selenium and tellurium; Z is a member selected from the group consisting of hydroxyl, mercapto, halogen and thiocyanate; R is a member selected from the group consisting of hydroxyl, mercapto, halogen, carboxyl and carbalkoxy in which the alkyl group contains from 1 to 3 carbon atoms; and $n$ is a numeral varying from 1 to 5 when R is any one of said hydroxyl, mercapto and halogen members, and varying from 0 to 5 when R is any one of said carboxyl and carbalkoxy members; and an inert carrier for said compound.

15. The method of inhibiting fungus growth which comprises contacting a medium subject to said growth with a compound having the general formula:

$$Ar-B-\underset{Z}{CH}-(CH_2)_n-R$$

in which Ar is a phenyl group; B is a member selected from the group consisting of sulfur, selenium and tellurium; Z is a member selected from the group consisting of hydroxyl, mercapto, halogen and thiocyanate; R is a member selected from the group consisting of hydroxyl, mercapto, halogen, carboxyl and carbalkoxy in which the alkyl group contains from 1 to 3 carbon atoms; and $n$ is a numeral varying from 1 to 5 when R is any one of said hydroxyl, mercapto and halogen members, and varying from 0 to 5 when R is any one of said carboxyl and carbalkoxy members.

16. The method of claim 15 wherein said compound is alpha-mercaptophenylmercaptoacetic acid methyl ester.

17. The method of claim 15 wherein the compound is alpha-bromophenylmercaptoacetic acid.

18. The method of claim 15 wherein the compound is alpha-hydroxyphenylmercaptoacetic acid.

19. The method of claim 15 wherein the compound is alpha-hydroxyphenylmercaptoacetic acid methyl ester.

20. The method of claim 15 wherein the compound is alpha-mercaptophenylmercaptoacetic acid.

21. The method of inhibiting fungus growth on an inanimate object subject to said growth comprising contacting said object with a compound having the general formula:

$$Ar-B-\underset{Z}{CH}-(CH_2)_n-R$$

in which Ar is a phenyl group; B is a member selected from the group consisting of sulfur, selenium and tellurium; Z is a member selected from the group consisting of hydroxyl, mercapto, halogen and thiocyanate; R is a member selected from the group consisting of hydroxyl, mercapto, halogen, carboxyl, and carbalkoxy in which the alkyl group contains from 1 to 3 atoms; and $n$ is a numeral varying from 1 to 5 when R is any one of said hydroxyl, mercapto and halogen members, and varying from 0 to 5 when R is any one of said carboxyl and carbalkoxy members.

References Cited in the file of this patent

UNITED STATES PATENTS

| | | |
|---|---|---|
| 2,322,761 | Lontz | June 29, 1943 |
| 2,556,134 | Croxall et al. | June 5, 1951 |
| 2,557,779 | Britton | June 19, 1951 |
| 2,561,574 | Howe | July 24, 1951 |
| 2,571,901 | Lawlor | Oct. 16, 1951 |
| 2,614,963 | Elson | Oct. 21, 1952 |
| 2,642,373 | Dazzi | June 16, 1953 |
| 2,724,721 | Reiner et al. | Nov. 22, 1955 |
| 2,880,137 | Elson | Mar. 31, 1959 |

OTHER REFERENCES

Drug and Cosmetic Industry, vol. 65, No. 4, October 1949, pp. 394–395.